(12) United States Patent
Geis

(10) Patent No.: US 8,336,504 B1
(45) Date of Patent: Dec. 25, 2012

(54) PET COLLAR WITH RETRACTABLE LEASH

(76) Inventor: Jodi A. Geis, Iliff, CO (US)

(*) Notice: Subject to any disclaimer, the term of this patent is extended or adjusted under 35 U.S.C. 154(b) by 0 days.

(21) Appl. No.: 13/084,196

(22) Filed: Apr. 11, 2011

(51) Int. Cl.
*A01K 27/00* (2006.01)

(52) U.S. Cl. ........................................ 119/794; 119/796

(58) Field of Classification Search ................. D30/152; 119/794, 795, 796, 797, 798, 789, 856, 863
See application file for complete search history.

(56) References Cited

U.S. PATENT DOCUMENTS

| | | | |
|---|---|---|---|
| 883,384 A * | 3/1908 | Bremer | 119/858 |
| 1,127,249 A * | 2/1915 | Hughes | 119/654 |
| 1,657,250 A * | 1/1928 | Fetters | 119/858 |
| 2,799,245 A | 7/1957 | Ruggiero et al. | |
| 4,137,660 A * | 2/1979 | Dettmann et al. | 40/303 |
| 4,178,879 A * | 12/1979 | Cunningham | 119/858 |
| 4,328,767 A * | 5/1982 | Peterson | 119/794 |
| 4,598,666 A * | 7/1986 | Spanko | 119/855 |
| 4,964,370 A * | 10/1990 | Peterson | 119/794 |
| D337,866 S | 7/1993 | Wiens | |
| D346,885 S * | 5/1994 | Milo et al. | D30/152 |
| D402,224 S * | 12/1998 | Makarewycz | D11/3 |
| 6,481,382 B2 | 11/2002 | Cohn | |
| 6,581,547 B1 | 6/2003 | Austin | |
| 7,017,527 B2 * | 3/2006 | Price | 119/794 |
| 7,160,167 B2 * | 1/2007 | Peters | 441/88 |
| 7,174,857 B2 | 2/2007 | Lord | |
| 7,240,446 B2 * | 7/2007 | Bekker | 40/633 |
| 7,461,615 B2 | 12/2008 | Albright | |
| 7,610,880 B2 * | 11/2009 | Lord | 119/794 |
| D616,615 S * | 5/2010 | Alvarenga | D30/152 |
| 2004/0154556 A1 * | 8/2004 | Masterson et al. | 119/794 |
| 2005/0211189 A1 * | 9/2005 | Price | 119/794 |
| 2006/0288960 A1 | 12/2006 | Harrison | |
| 2007/0039560 A1 * | 2/2007 | Smith | 119/794 |
| 2007/0130813 A1 * | 6/2007 | Stacy | 40/633 |
| 2008/0000432 A1 * | 1/2008 | Alhegelan | 119/796 |
| 2008/0017134 A1 * | 1/2008 | Robley et al. | 119/796 |
| 2008/0163830 A1 | 7/2008 | Dagnon | |
| 2009/0255485 A1 * | 10/2009 | Dickie et al. | 119/794 |
| 2009/0255486 A1 * | 10/2009 | Thompson et al. | 119/794 |
| 2011/0023794 A1 * | 2/2011 | Smith | 119/794 |
| 2011/0036304 A1 * | 2/2011 | Smith | 119/796 |
| 2011/0126778 A1 * | 6/2011 | Mitchell | 119/796 |
| 2011/0174238 A1 * | 7/2011 | Dagnon | 119/794 |
| 2011/0315090 A1 * | 12/2011 | Marshall | 119/796 |

* cited by examiner

*Primary Examiner* — Yvonne Abbott

(57) ABSTRACT

A pet collar with retractable leash provides a comfortable collar structure having a retractable leash selectively extendable from the collar. The assembly includes a collar having a first end portion, a second end portion, and a medial portion extending between the first end portion and the second end portion. A buckle is coupled to the first end portion of the collar. The buckle is selectively securable to the second end portion of the collar to secure the collar around a neck of an animal. A reel assembly is coupled to the medial portion of the collar. A line has a first end coupled to the reel assembly and a second end selectively extendable from the reel assembly.

17 Claims, 4 Drawing Sheets

PET COLLAR WITH RETRACTABLE LEASH

BACKGROUND OF THE DISCLOSURE

Field of the Disclosure

The disclosure relates to animal restraint devices and more particularly pertains to a new animal restraint device for providing a comfortable collar structure having a retractable leash selectively extendable from the collar.

SUMMARY OF THE DISCLOSURE

An embodiment of the disclosure meets the needs presented above by generally comprising a collar having a first end portion, a second end portion, and a medial portion extending between the first end portion and the second end portion. A buckle is coupled to the first end portion of the collar. The buckle is selectively securable to the second end portion of the collar to secure the collar around a neck of an animal. A reel assembly is coupled to the medial portion of the collar. A line has a first end coupled to the reel assembly and a second end selectively extendable from the reel assembly.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
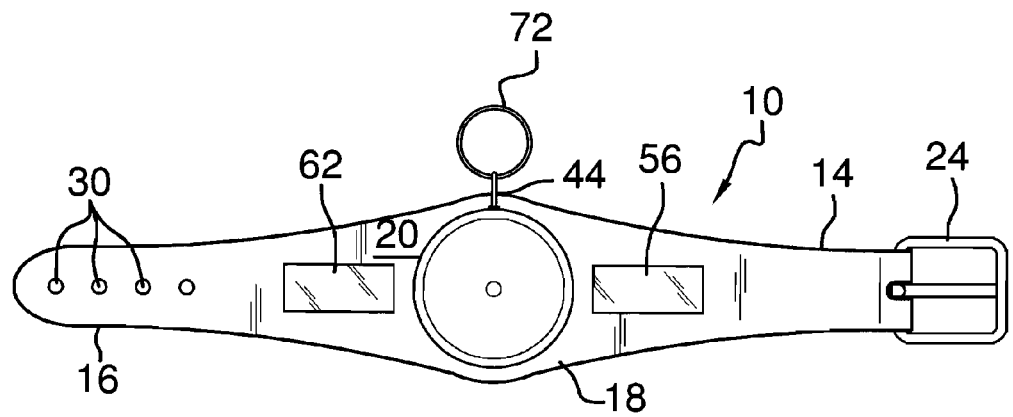
FIG. 1 is a front view of a pet collar with retractable leash according to an embodiment of the disclosure.
Figure 2:
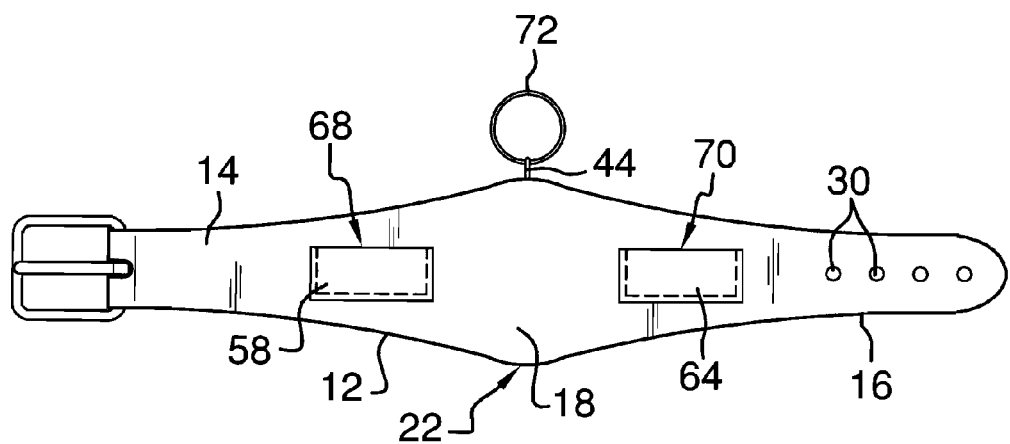
FIG. 2 is a back view of an embodiment of the disclosure.
Figure 3:
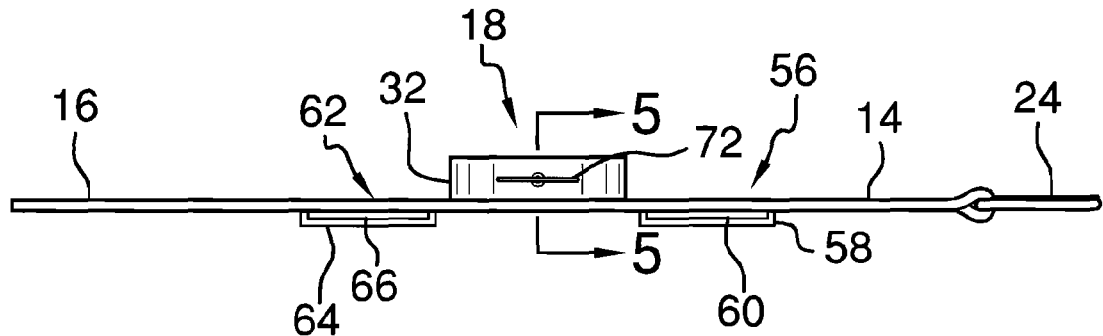
FIG. 3 is a top view of an embodiment of the disclosure.
Figure 4:
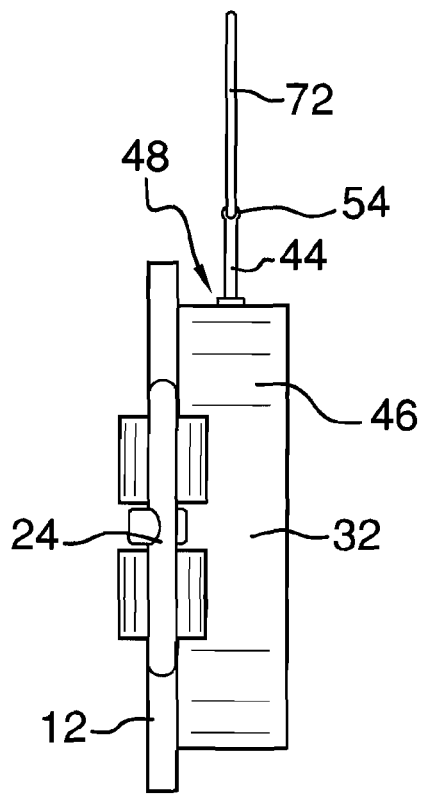
FIG. 4 is a side view of an embodiment of the disclosure.
Figure 5:
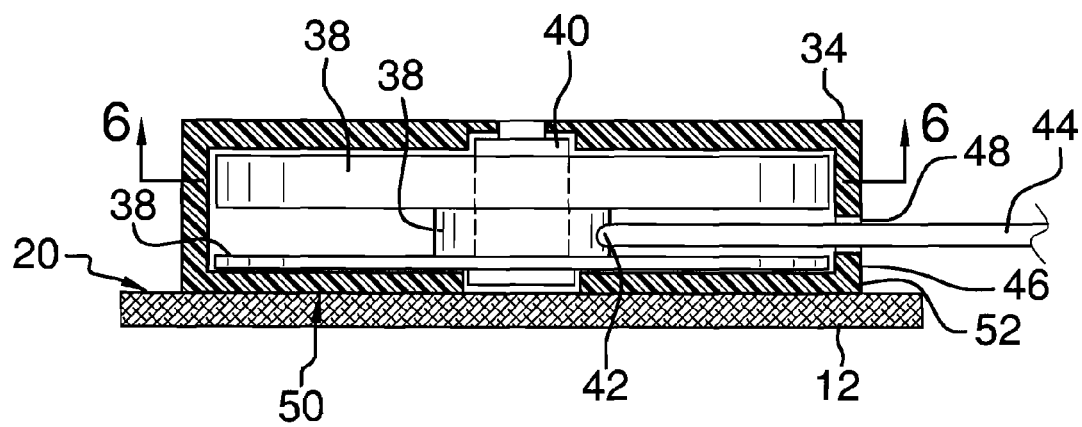
FIG. 5 is a cross-sectional view of an embodiment of the disclosure taken along line 5-5 of FIG. 3.
Figure 6:
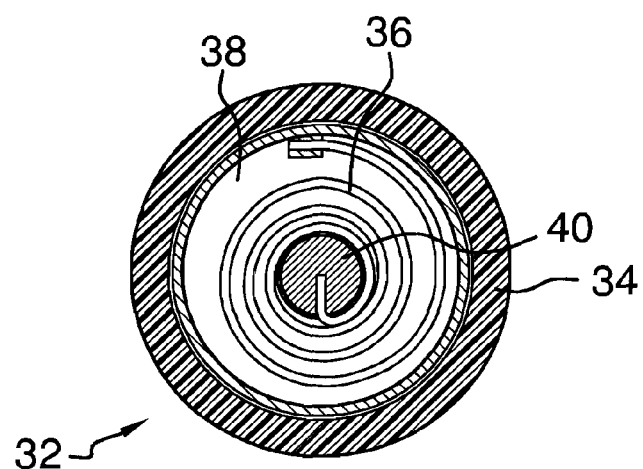
FIG. 6 is a cross-sectional view of an embodiment of the disclosure taken along line 6-6 of FIG. 5.
Figure 7:
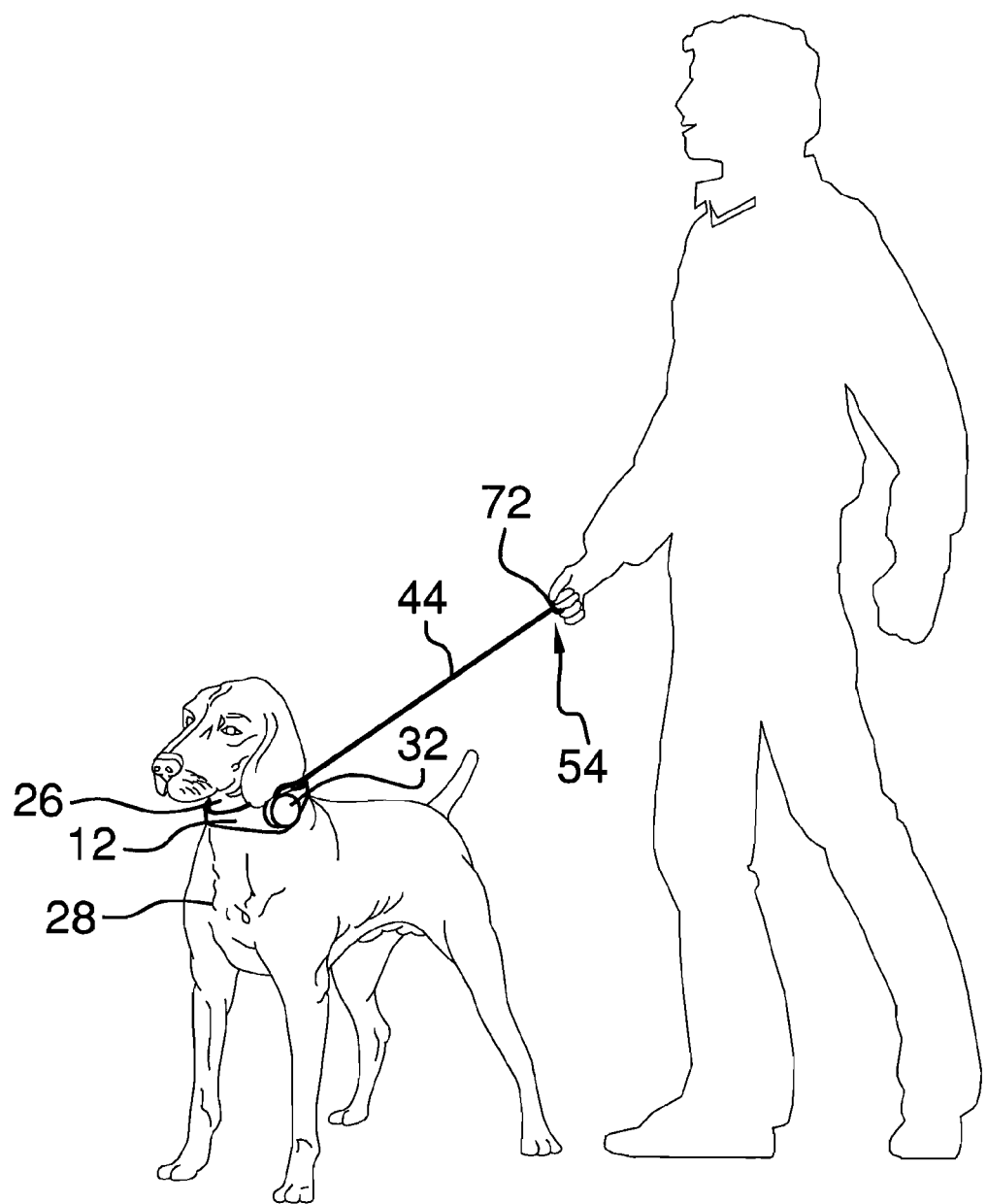
FIG. 7 is a top front side perspective view of an embodiment of the disclosure in use.

With reference now to the drawings, and in particular to FIGS. 1 through 7 thereof, a new animal restraint device embodying the principles and concepts of an embodiment of the disclosure and generally designated by the reference numeral 10 will be described.

As best illustrated in FIGS. 1 through 7, the pet collar with retractable leash 10 generally comprises a collar 12 having a first end portion 14, a second end portion 16, and a medial portion 18 extending between the first end portion 14 and the second end portion 16. The medial portion 18 of the collar 12 has a planar top surface 20. The medial portion 18 of the collar 12 also has a width greater than a width of the first end portion 14 and the second end portion 16 such that the collar has a broad center 22 tapering towards the first end portion 14 and the second end portion 16. A buckle 24 is coupled to the first end portion 14 of the collar 12. The buckle 24 is selectively securable to the second end portion 16 of the collar 12. Thus, the collar 12 is configured for being secured around a neck 26 of an animal 28. The second end portion 16 may include a plurality of spaced holes 30. Each hole 30 may be engageable to the buckle 24 whereby a diameter of the collar 12 is adjustable. Alternately, a compression type buckle assembly or equivalent buckle type may be employed.

A reel assembly 32 is coupled to the medial portion 18 of the collar 12. The reel assembly 32 includes a disc-shaped housing 34, a biasing member 36, a spool 38, and a spindle 40. The spool 38 is rotatably coupled to the spindle 40. The biasing member 36 is coupled to the spindle 40 and the spool 38. A first end 42 of a line 44 is coupled to the spool 38. The housing 34 includes a perimeter wall 46 and the perimeter wall 46 includes an aperture 48 positioned adjacent the spool 38. The housing 34 has a planar bottom surface 50 abutting the planar top surface 20 of the medial portion 18 of the collar 12. The planar top surface 20 of the medial portion 18 of the collar 12 extends outwardly from an outer perimeter 52 of the bottom surface 50 of the housing 34. Thus, the bottom surface 50 of the housing 34 is fully covered by the medial portion 18 of the collar 12. Full coverage and stiffness of the collar 12 prevents twisting during use that may cause discomfort to the animal 28 during use.

The line 44 has the first end 42 coupled to the reel assembly 32. The line 44 also has a second end 54 selectively extendable from the reel assembly 34. The biasing member 36 urges the line 44 through the aperture 48 to be coiled onto the spool 38. The line 44 extends through the aperture 48 and may be pulled through the aperture 48 to extend the line 44 from the reel assembly 34.

A first window 56 is positioned in the collar 12. A first pocket 58 having an open side 68 is coupled to the collar 12. The first pocket 58 is positioned adjacent to the first window 56. Thus, the first window 56 is configured for displaying a tag 60 positioned in the first pocket 56. Similarly, a second window 62 is positioned in the collar 12. The reel assembly 34 is positioned between the first window 56 and the second window 62. A second pocket 64 is coupled to the collar 12. The second pocket 64 has an open side 70 and is positioned adjacent to the second window 62. Thus, the second window 62 is configured for displaying a second tag 66 positioned in the second pocket 64. A ring 72 may be coupled to the second end 54 of the line 44 to facilitate grasping of the line 44 or prevent the biasing member 36 from fully retracting the line 44 into the housing 34 of the reel assembly 32.

In use, the collar 12 is secured to the neck 26 of the animal 28. The ring 72 may then be grasped whenever desired such that the line 44 extends from the housing 34 to form a leash for the animal 28. When the leash is no longer needed, the line 44 is released and the biasing member 36 retracts the line 44 into the reel assembly 32 until needed. Identification and vaccination history may be attached to the collar 12 using the first pocket 58, first window 56, second pocket 64, and second window 62.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A pet restraint assembly comprising:
a collar having a first end portion, a second end portion, and a medial portion extending between said first end portion and said second end portion;
a buckle coupled to said first end portion of said collar, said buckle being selectively securable to said second end portion of said collar whereby said collar is configured for being secured around a neck of an animal;
a reel assembly coupled to said medial portion of said collar;
a line having a first end coupled to said reel assembly, said line having a second end selectively extendable from said reel assembly;
wherein said reel assembly includes a housing, a biasing member, a spool, and a spindle, said spool being rotatably coupled to said spindle, said biasing member being coupled to said spindle and said spool, said first end of said line being coupled to said spool whereby said biasing member urges said line to be coiled onto said spool;
said medial portion of said collar having a planar top surface;
said housing having a planar bottom surface abutting said planar top surface of said medial portion of said collar; and
wherein said planar top surface of said medial portion of said collar extends outwardly from an outer perimeter of said bottom surface of said housing whereby said bottom surface of said housing is fully covered by said medial portion of said collar.

2. The assembly of claim 1, wherein said medial portion of said collar has a width greater than a width of said first end portion and said second end portion.

3. The assembly of claim 1, further comprising:
a first window positioned in said collar; and
a first pocket coupled to said collar, said pocket being positioned adjacent to said first window whereby said first window is configured for displaying a tag positioned in said first pocket.

4. The assembly of claim 3, further comprising:
a second window positioned in said collar; and
a second pocket coupled to said collar, said pocket being positioned adjacent to said second window whereby said second window is configured for displaying a tag positioned in said second pocket.

5. The assembly of claim 1, wherein said second end portion includes a plurality of spaced holes, each said hole being engageable to said buckle whereby a diameter of said collar is adjustable.

6. The assembly of claim 1, further including a ring coupled to said second end of said line.

7. The assembly of claim 1, wherein said housing is disc-shaped.

8. The assembly of claim 1, wherein said housing includes a perimeter wall, said perimeter wall includes an aperture, and said line extends through said aperture.

9. A pet restraint assembly comprising:
a collar having a first end portion, a second end portion, and a medial portion extending between said first end portion and said second end portion;
a buckle coupled to said first end portion of said collar, said buckle being selectively securable to said second end portion of said collar whereby said collar is configured for being secured around a neck of an animal;
a reel assembly coupled to said medial portion of said collar;
a line having a first end coupled to said reel assembly, said line having a second end selectively extendable from said reel assembly;
a first window positioned in said collar;
a first pocket coupled to said collar, said pocket being positioned adjacent to said first window whereby said first window is configured for displaying a tag positioned in said first pocket;
a second window positioned in said collar;
a second pocket coupled to said collar, said pocket being positioned adjacent to said second window whereby said second window is configured for displaying a tag positioned in said second pocket; and
wherein said reel assembly is positioned between said first window and said second window.

10. The assembly of claim 9, wherein said medial portion of said collar has a width greater than a width of said first end portion and said second end portion.

11. The assembly of claim 9, wherein said reel assembly includes a housing, a biasing member, a spool, and a spindle, said spool being rotatably coupled to said spindle, said biasing member being coupled to said spindle and said spool, said first end of said line being coupled to said spool whereby said biasing member urges said line to be coiled onto said spool.

12. The assembly of claim 11, further comprising:
said medial portion of said collar having a planar top surface; and
said housing having a planar bottom surface abutting said planar top surface of said medial portion of said collar.

13. The assembly of claim 9, wherein said second end portion includes a plurality of spaced holes, each said hole being engageable to said buckle whereby a diameter of said collar is adjustable.

14. The assembly of claim 11, wherein said housing is disc-shaped.

15. The assembly of claim 11, wherein said housing includes a perimeter wall, said perimeter wall includes an aperture, and said line extends through said aperture.

16. The assembly of claim 9, further including a ring coupled to said second end of said line.

17. A pet restraint assembly comprising:
a collar having a first end portion, a second end portion, and a medial portion extending between said first end portion and said second end portion, said medial portion of said collar having a planar top surface, said medial portion of said collar having a width greater than a width of said first end portion and said second end portion;
a buckle coupled to said first end portion of said collar, said buckle being selectively securable to said second end portion of said collar whereby said collar is configured for being secured around a neck of an animal, wherein said second end portion includes a plurality of spaced holes, each said hole being engageable to said buckle whereby a diameter of said collar is adjustable;
a reel assembly coupled to said medial portion of said collar, said reel assembly includes a disc-shaped housing, a biasing member, a spool, and a spindle, said spool being rotatably coupled to said spindle, said biasing member being coupled to said spindle and said spool, said first end of said line being coupled to said spool, said housing including a perimeter wall, said perimeter wall including an aperture positioned adjacent said spool, said housing having a planar bottom surface abutting said planar top surface of said medial portion of said collar, wherein said planar top surface of said medial portion of said collar extends outwardly from an outer perimeter of said bottom surface of said housing whereby said bottom surface of said housing is fully covered by said medial portion of said collar;

a line having a first end coupled to said reel assembly, said line having a second end selectively extendable from said reel assembly, said biasing member urging said line to be coiled onto said spool, and said line extending through said aperture;

a first window positioned in said collar;

a first pocket coupled to said collar, said pocket being positioned adjacent to said first window whereby said first window is configured for displaying a tag positioned in said first pocket;

a second window positioned in said collar, said reel assembly being positioned between said first window and said second window;

a second pocket coupled to said collar, said pocket being positioned adjacent to said second window whereby said second window is configured for displaying a tag positioned in said second pocket; and a ring coupled to said second end of said line.

* * * * *